(12) United States Patent
Jager et al.

(10) Patent No.: US 8,011,304 B2
(45) Date of Patent: Sep. 6, 2011

(54) GATE RETENTION MECHANISM FOR A CONVEYOR ASSEMBLY

(75) Inventors: Todd Jager, Sioux City, IA (US); Carlton Beers, Pisgah, IA (US)

(73) Assignee: Industrial Design Fabrication & Installation, Inc., Sioux City, IA (US)

( * ) Notice: Subject to any disclaimer, the term of this patent is extended or adjusted under 35 U.S.C. 154(b) by 865 days.

(21) Appl. No.: 11/836,268

(22) Filed: Aug. 9, 2007

(65) Prior Publication Data

US 2009/0038498 A1    Feb. 12, 2009

(51) Int. Cl.
*B61B 3/00*    (2006.01)
(52) U.S. Cl. .................................................. 104/100
(58) Field of Classification Search .......... 104/89, 104/96, 98, 100, 102, 103, 130.01, 130.02
See application file for complete search history.

(56) References Cited

U.S. PATENT DOCUMENTS

| | | | |
|---|---|---|---|
| 2,746,397 A | 5/1956 | Le Fiell | |
| 2,873,689 A | 2/1959 | Claud-Mantle | |
| 2,944,491 A | 7/1960 | Fiell | |
| 3,063,384 A | 11/1962 | Sackett | |
| 3,336,877 A | 8/1967 | O'Donnell | |
| 3,503,336 A | 3/1970 | Heiberg | |
| 3,538,853 A | 11/1970 | Dehne | |
| 3,577,930 A | 5/1971 | Rooklyn | |
| 3,760,739 A | 9/1973 | Benner | |
| 4,016,818 A | 4/1977 | Ellzey | |
| 4,453,469 A | 6/1984 | Bedford | |
| 4,646,646 A * | 3/1987 | Swilley | 104/100 |
| 4,993,326 A | 2/1991 | Bergemann | |
| 5,152,226 A * | 10/1992 | Swilley | 104/100 |
| 5,697,301 A | 12/1997 | Sporer | |
| 6,427,831 B1 | 8/2002 | Norton | |
| 6,651,937 B1 | 11/2003 | Wilson | |
| 6,742,286 B2 | 6/2004 | Giovale | |
| 6,855,451 B2 | 2/2005 | Ghosh et al. | |
| 7,104,157 B1 | 9/2006 | Hilliard | |
| 2010/0243332 A1 | 9/2010 | Paxton, III | |
| 2011/0094839 A1 | 4/2011 | Blomberg et al. | |
| 2011/0095248 A1 | 4/2011 | Young et al. | |

FOREIGN PATENT DOCUMENTS

| | | |
|---|---|---|
| DE | 4314458 | 9/1994 |
| DE | 4314459 | 9/1994 |

* cited by examiner

*Primary Examiner* — Joe Morano, IV
*Assistant Examiner* — R. J. McCarry, Jr.
(74) *Attorney, Agent, or Firm* — Lathrop & Clark LLP

(57) ABSTRACT

A rail section for use in a rail switch and method for assembling same are provided. The rail section is connected to a switch mounting by inserting a portion of the switch mounting through an aperture provided in the rail section and then applying a double weld. Similarly, a gate operating mechanism is connected to the rail section by inserting a portion of the gate operating mechanism through an aperture provided in the rail section and then applying a double weld. A receptor portion of the rail section that is reinforced to withstand a greater load is also provided. A plurality of gate retention mechanisms are also disclosed.

18 Claims, 21 Drawing Sheets

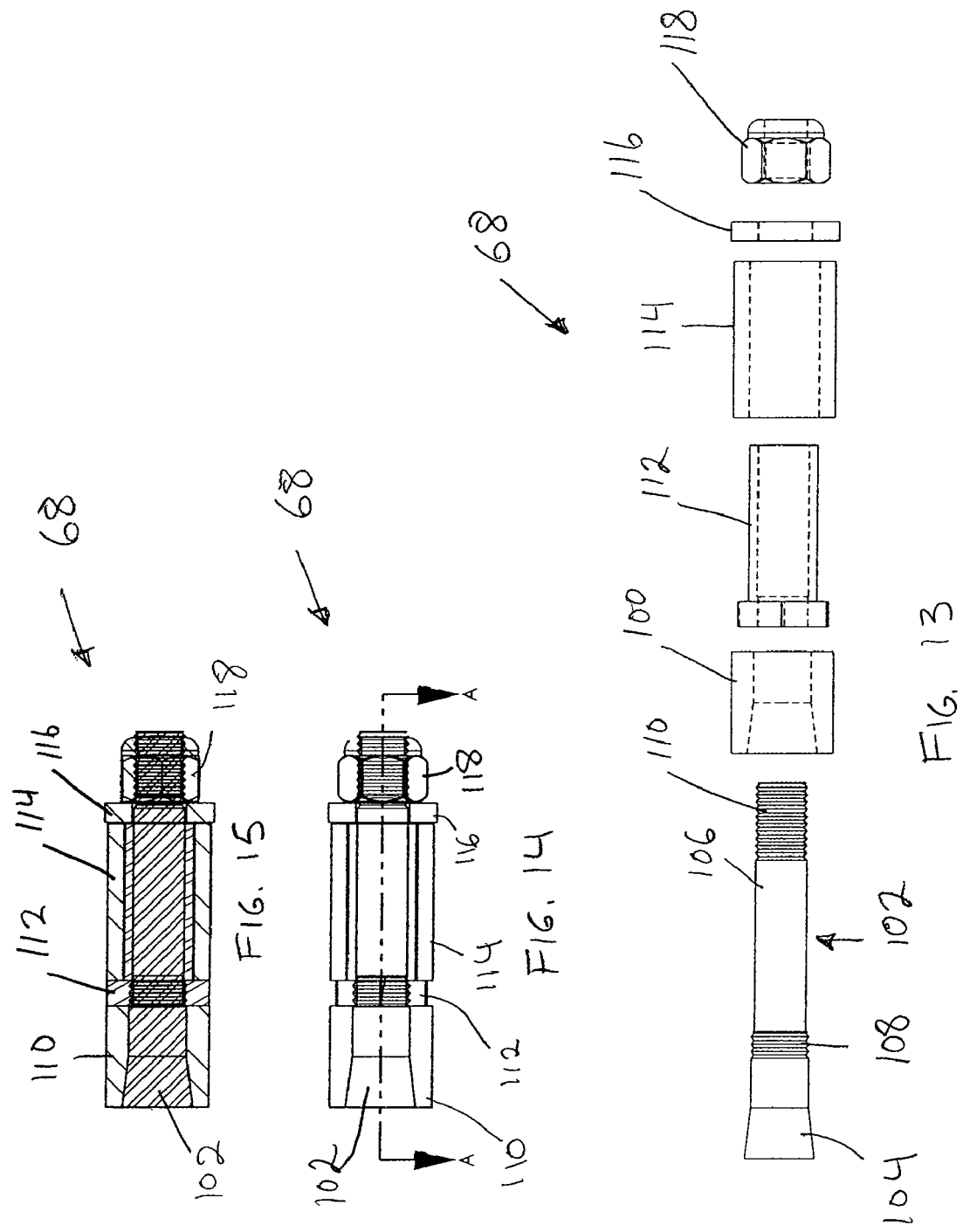

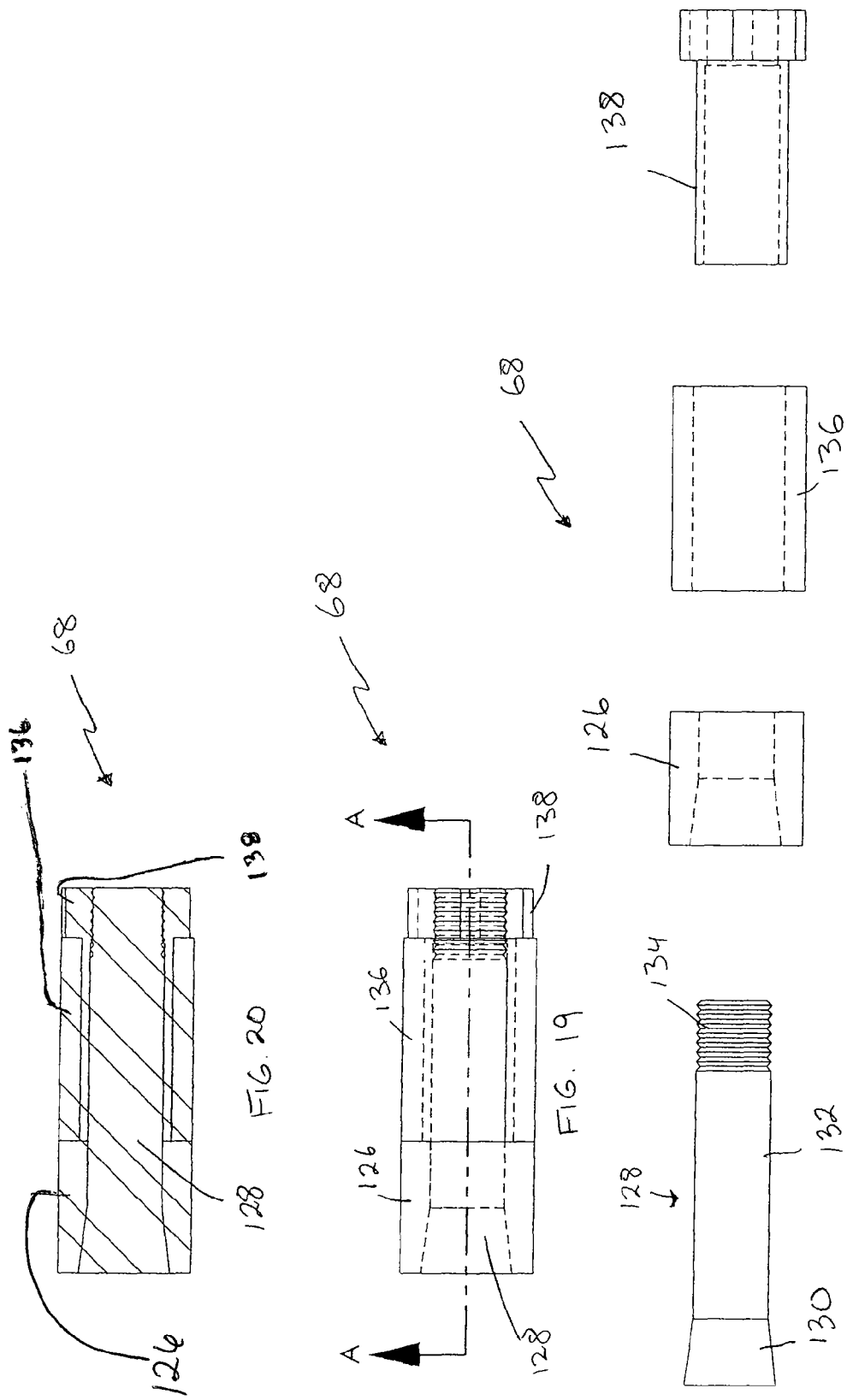

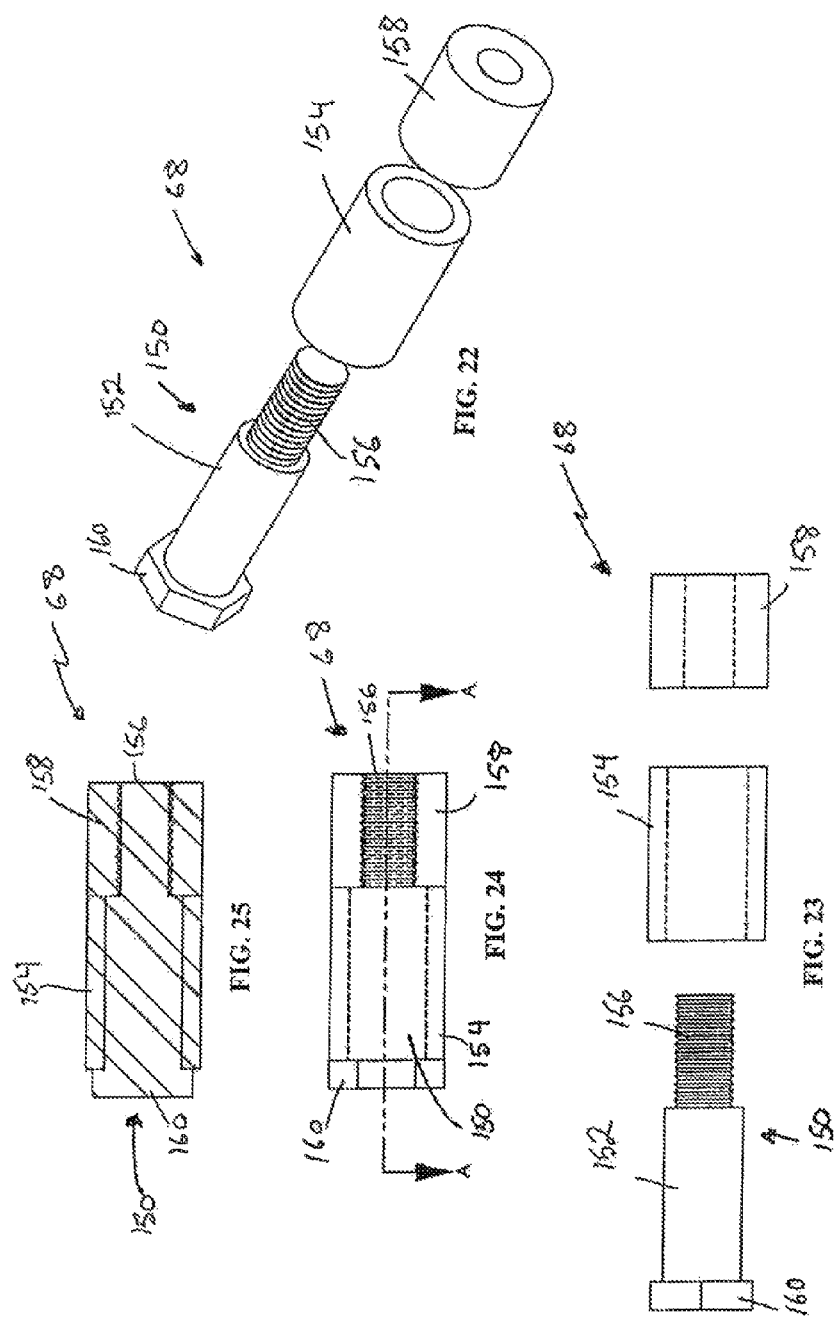

GATE RETENTION MECHANISM FOR A CONVEYOR ASSEMBLY

FIELD OF INVENTION

The rail section, switch mechanism, and method disclosed relate generally to switching mechanisms used in directing the movement of objects in various directions along a rail or track system, and more particularly to overhead rails and switching mechanisms for conveyors.

BACKGROUND

It is known to use overhead rail systems along which trolleys travel in order to move goods during processing or manufacture. The overhead rail systems are designed and installed so that goods may be suspended from the trolleys and then moved in different directions along the rail system to transfer the goods from a first location to a second location. For example, such overhead rail systems are commonly used in meat packing plants in which meat is hung from the trolley. Some overhead rail systems use a rail switching mechanism at points in the track or rail where rails traveling in different directions intersect. The switching mechanism operates to control and direct the movement of the trolleys along various routes of the track system.

Generally, rail switching mechanisms include a switch mounting which may be suspended from a ceiling or attached to a wall, beam, or other support, and which is used to support the rail sections used in the switching mechanism. The rail sections which are used may be either straight rail sections or curved rail sections. The rail sections may be bolted to the switch mounting, or they may be connected by welding them to the switch mounting. The rail sections used in the switching mechanism also contain one or more gate receptors for receiving the gates which are attached to the rail section. The gate receptors are formed by the absence of a portion of the rail so that a gate can close and be seated in the gate receptor. A gate operating mechanism is used to attach the gate to the rail section and for opening and closing the gate once it is attached to the rail section. Typically, these gate operating mechanisms are welded only to one side of the rail section. The opening and closing of the gates controls the movement of trolleys along intersecting rails in the rail system.

Switching mechanisms currently being used have been found to be structurally weak at certain points so that they are unable to support the weight of the goods as the trolleys travel across the rail sections. Specifically, these switching mechanisms have been found to be weak at the points where the rail section connects to the switch mounting and gate operating mechanism, and also at the gate receptor portion of the rail section. These structural weaknesses in the switching mechanism significantly reduce the structural load capabilities of the rail and are prone to breakage. Not only does this cost time and expense for the repair and/or replacement of components, but this is also a serious safety hazard because falling product from a broken switch could injure employees or other people standing in the vicinity.

Another problem with switching mechanisms currently in use is that replacement parts may not fit well. Currently, the components of the rail section, such as the gate receptor, are hand cut and the pieces are welded or bolted together. This can lead to inaccuracies and imprecision which can cause parts not to fit properly, which, in turn, can lead to loose parts, wobble in the device, and other concerns.

Accordingly, what is needed in the art is a rail switching mechanism that is stronger and has increased structural load capacity. There is also a need in the art for a switch mechanism wherein the components of the switch mechanism are accurately and precisely formed to be within minimal tolerances so that parts are easily replaced.

SUMMARY OF THE INVENTION

To this end, an improved rail section and rail switch for a conveyor, and a method of manufacturing and assembling same, is provided. The rail section of the present invention comprises a connecting mechanism for connecting to the switch mounting and gate operating mechanism. Specifically, the connecting mechanism includes an aperture in the rail section through which a connecting portion of the switch mounting is inserted. Once the connecting portion of the switch mounting is inserted, a double weld can be used to hold the switch mounting in place. To accomplish this, one weld is placed on each face of the rail section at the point where the rail section contacts the switch mounting. The gate operating mechanism is connected to the rail section in much the same way. An aperture is provided, and a connecting portion of the gate operating mechanism is inserted through the aperture. A double weld may then be used to hold the gate operating mechanism in place. In this way, the rail section of the present invention provides stronger connection points that can withstand heavier loads.

The gate receptor of the present invention is also reinforced to withstand heavier loads. Specifically, a thickness and shape of the rail section is provided having increased strength. Furthermore, a rail section of the present invention may be CNC (Computer Numerically Controlled) cut from a single piece of material in order to add strength and improve the precision and reproducibility of components for a more precise fit.

Also provided are various alternate embodiments of the gate operating mechanisms which include a pin and a bushing.

BRIEF DESCRIPTION OF THE DRAWINGS

The invention will now be described, by way of example, with reference to the attached drawings, of which:

FIG. 13 is an exploded side elevational view of the gate operating mechanism of FIG. 12.

FIG. 14 is a side elevational view of the gate operating mechanism of FIG. 12 and FIG. 13.

FIG. 15 is a cross-sectional view of the gate operating mechanism of FIG. 14 taken along line A-A of FIG. 14.

FIG. 18 is a side elevation exploded view of the gate operating mechanism shown in FIG. 17.

FIG. 19 is a side elevation view of the gate operating mechanism shown in FIG. 17.

FIG. 20 is a cross-sectional view of the gate operating mechanism of FIG. 19 taken along line A-A of FIG. 19.

FIG. 22 is an exploded view of a gate operating mechanism of an alternative embodiment.

FIG. 23 is a side elevation exploded view of the gate operating mechanism of FIG. 22.

FIG. 24 is a side elevation view of the gate operating mechanism of FIG. 22.

FIG. 25 is a cross-sectional view of the gate operating mechanism of FIG. 24 taken along line A-A of FIG. 24.

DETAILED DESCRIPTION OF PREFERRED EMBODIMENTS

Figure 1:
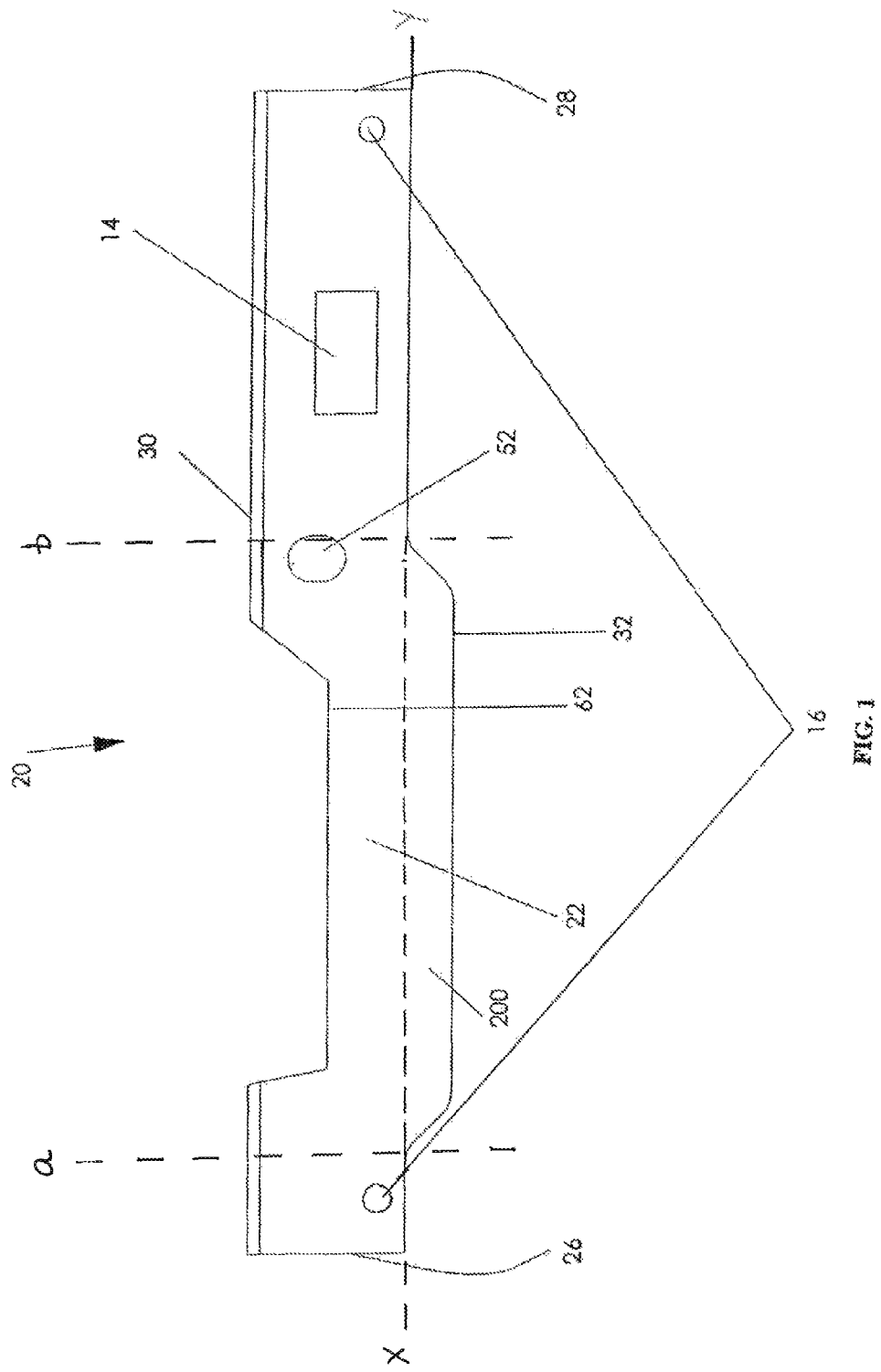
FIG. 1 is a side elevation view of the rail section of the present invention.

While the disclosure herein is particularly described with regard to overhead trolley conveyors used in food processing or manufacturing, it will be understood and apparent to those of skill in the art that the present invention has other applications where switching mechanisms are used at points where rails or tracks intersect, in order to direct the objects moving along a track system.

As can be seen in the Figures, the rail section 20 of the present invention generally comprises a first end 26, second end 28, first face 22, second face 24, a top surface 30 and a bottom surface 32. The rail section of the preferred embodiment also includes holes or apertures for connecting the rail section to other rails in the rail system and to the other components of a switch mechanism 60. The rail section 20 shown in FIGS. 1 and 2 includes two rail connecting holes 16 which are used to connect the rail to the other adjacent rails of the system (not shown) which make up the track of the conveyor assembly. One of the rail connecting holes is located near the first end 26 and the other located near the second end 28.

Figure 3:
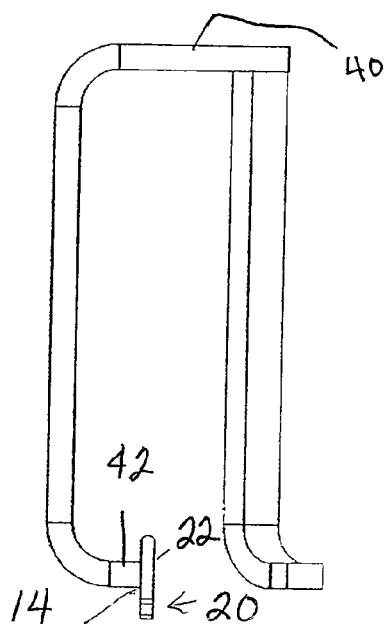
FIGS. 3-5 show a plurality of perspective views of the rail section attached to a switch mounting.
Figure 4:
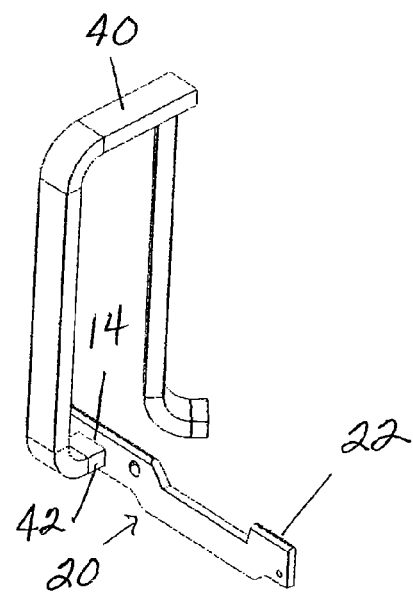
Figure 5:
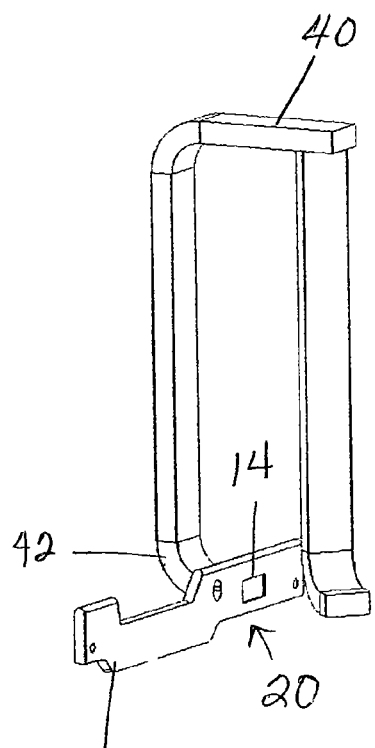
Figure 6:
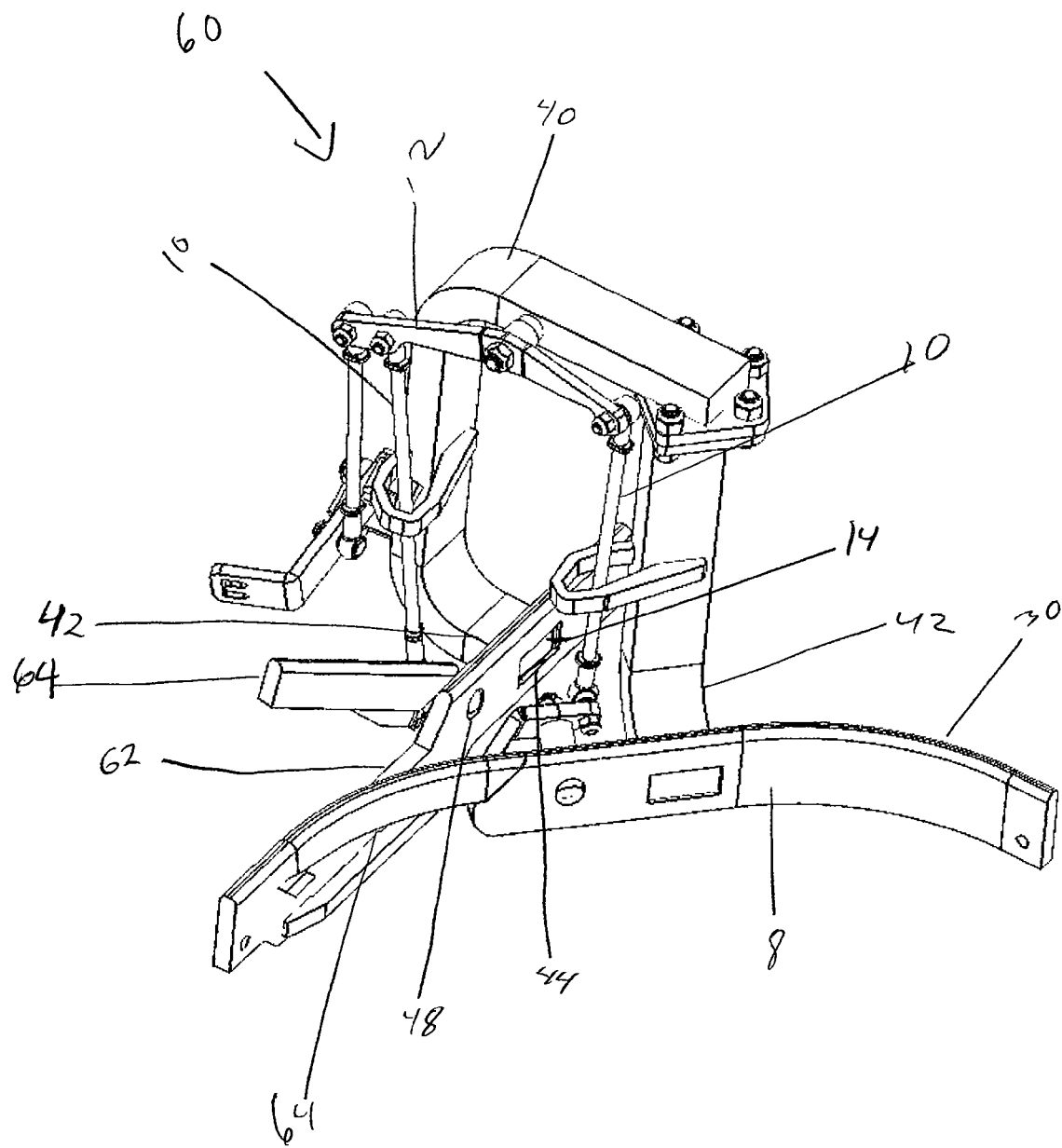
FIG. 6 is a perspective view of the switch assembly of the present invention.
Figure 7:
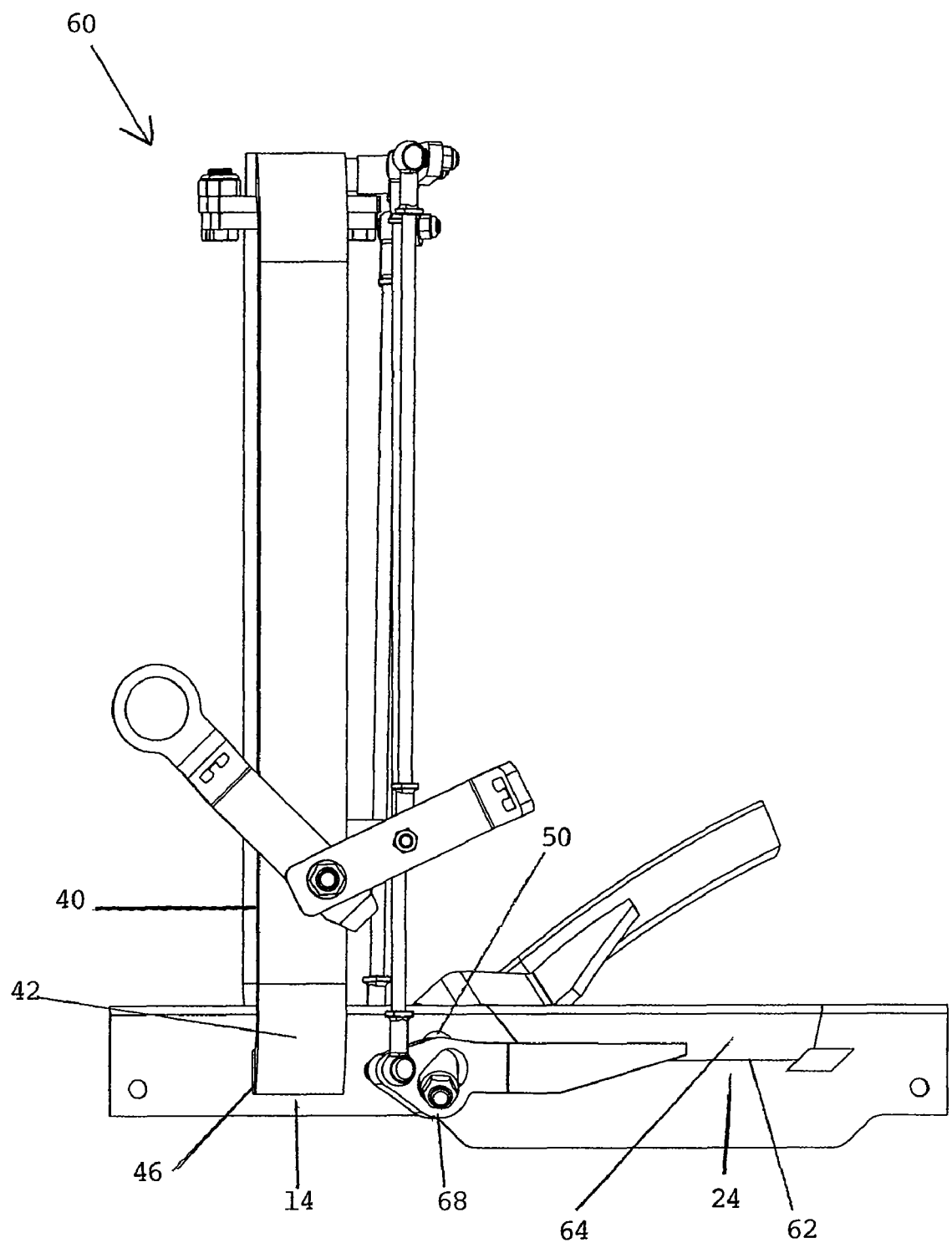
FIG. 7 is a side elevation view of the switch assembly.

The rail section 20 also includes a mount connecting mechanism 14 for connecting the rail section 20 to a switch mounting 40, as seen in FIGS. 3, 4, and 5. The mount connecting mechanism 14 comprises an aperture, hole, or cutout portion of the rail section. The aperture of the mount connecting mechanism 14 illustrated in the figures is of a rectangular shape, but could be any of a number of other shapes including square, circular, or triangular. Preferably, the aperture is shaped to mate with a portion of the switch mounting 40. The switch mounting 40 includes one or more mount connecting portions 42. The mount connecting portion 42 of the switch mounting 40 is preferably of a similar dimension to the aperture of the mount connecting mechanism 14 so that the mount connecting portion 42 can be inserted into the aperture of the mount connecting mechanism 14 to achieve a snug fit. However, alternative shapes and dimensions that mate with the mount connecting mechanism are contemplated. The mount connecting portion 42 of the switch mounting 40 is received in the aperture of the mount connecting mechanism 14. The rail section 20 is further connected by a double weld. Specifically, a first weld mounting 44 is provided at the contact position of connecting portion 42 and the first face 22 (FIG. 6). A second weld mounting 46 is provided on the opposite side of the rail section, at the contact position of the mount connecting portion 42 and second face 24 (FIG. 7). Thus, the mount connecting mechanism 14 of the present invention includes the aperture through which the mount connecting portion 42 of the switch mounting 40 is inserted, a first weld mounting 44 and a second weld mounting 46.

Figure 2:
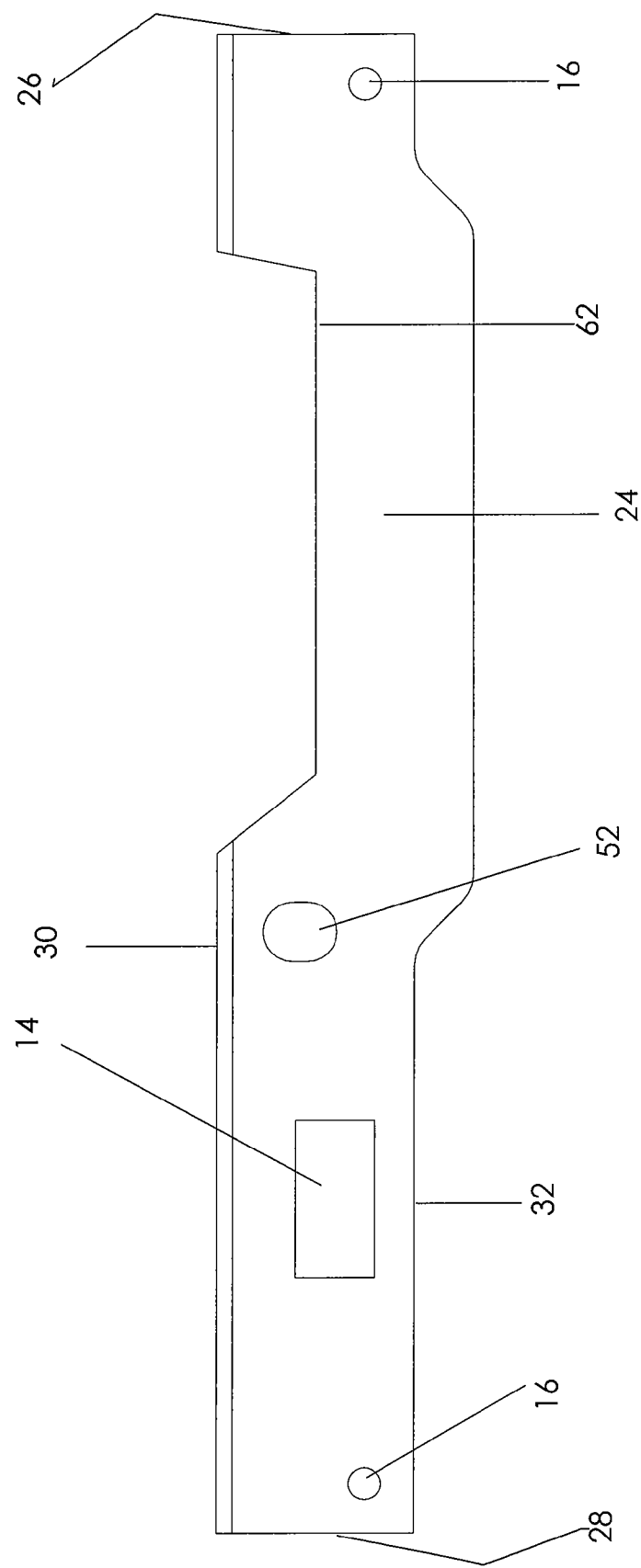
FIG. 2 is a side elevation view of the rail section of the present invention displaying the side opposite that displayed in FIG. 1.
Figure 8:
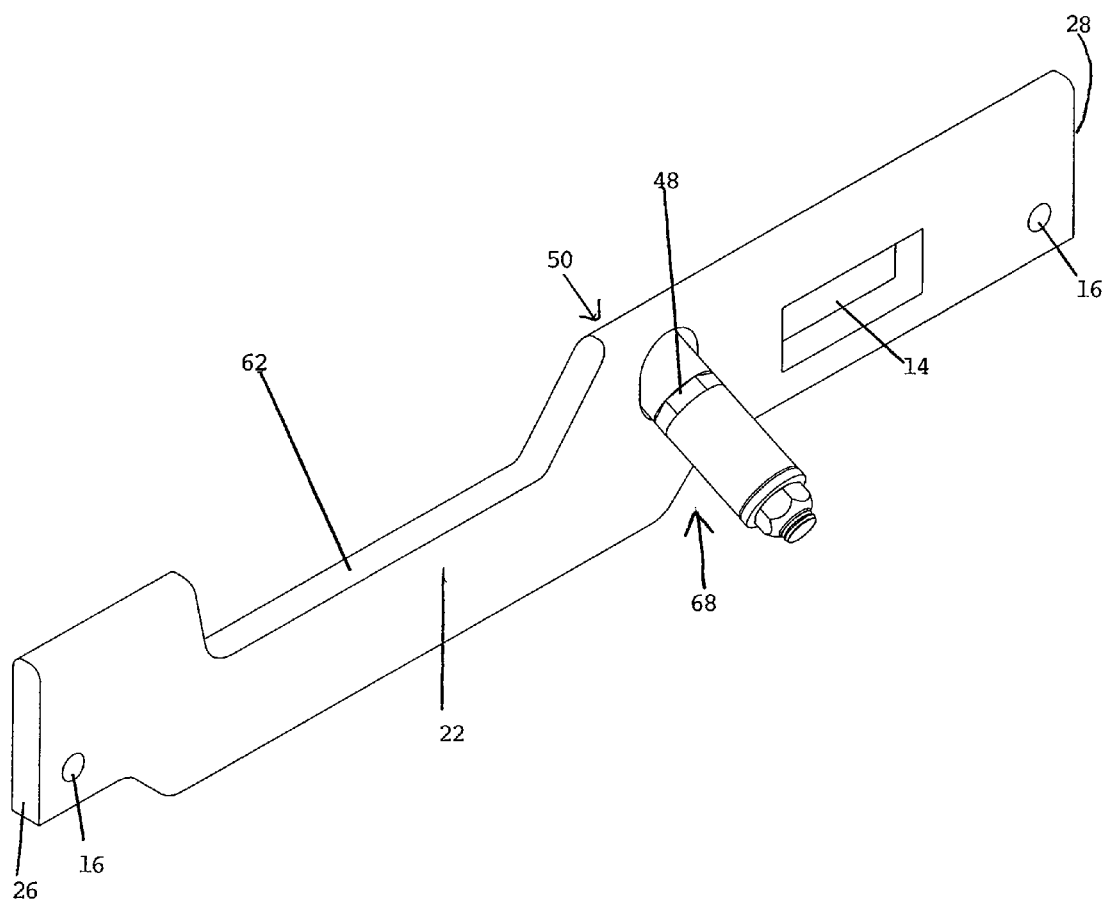
FIG. 8 is a perspective view of a rail section of the present invention including a gate operating mechanism connected thereto according to one embodiment of the present invention.

In addition to the mount connecting portion, a receptor portion 62 for receiving a gate 64 is also provided in connection with the rail (see FIGS. 1 and 6-8). For purposes of discussion, the receptor portion 62 of the rail section 20, as shown in FIG. 1, includes the portion of the rail section between and extending to imaginary lines a and b. A gate connecting mechanism 52 is used to pivotally attach gate 64 to the rail section 20. Similar to the mount connecting mechanism 14, the gate connecting mechanism 52 includes an aperture, hole, or cutout portion of the rail section. The aperture of the gate connecting mechanism 52 described in the Figures is of a circular or oval shape, but could be any of a number of other shapes including but not limited to square, circular, or triangular. The gate 64 is attached to a gate operating mechanism 68 (see generally FIGS. 6-25). Gate operating mechanism 68 is used for opening and closing the gate, as well as for connecting the gate to the rail. Gate operating mechanism 68 includes a pin 82 which includes a gate connecting portion 66. The gate connecting portion 66 is shaped to mate with or be received in the aperture of the gate connecting mechanism 52 so that the gate connecting portion 66 can be inserted into the aperture of the gate connecting mechanism 52 to achieve a snug fit. However, variation in the shape and dimension of the gate connecting portion 66 would not depart from the overall scope of the present invention. The gate connecting portion 66 is received in the aperture of the gate connecting mechanism 52, and attached to the rail section 20 by a double weld. Similar to the mount connecting mechanism, the double weld includes a first weld mounting 48 positioned at the contact location of portion 66 and the first face 22 (see FIGS. 6 and 8). A second weld mounting 50 is positioned on the opposite side of the rail section, at the location of the contact position of the connecting portion 66 and the second face 24 (FIGS. 7 and 8). Thus, the gate connecting mechanism 52 of the present invention is similar to the mount connecting mechanism 14 used to connect the rail section 20 to a switch mounting 40, and it too includes an aperture through which a connecting portion is inserted, and two weld mountings.

Figure 9:
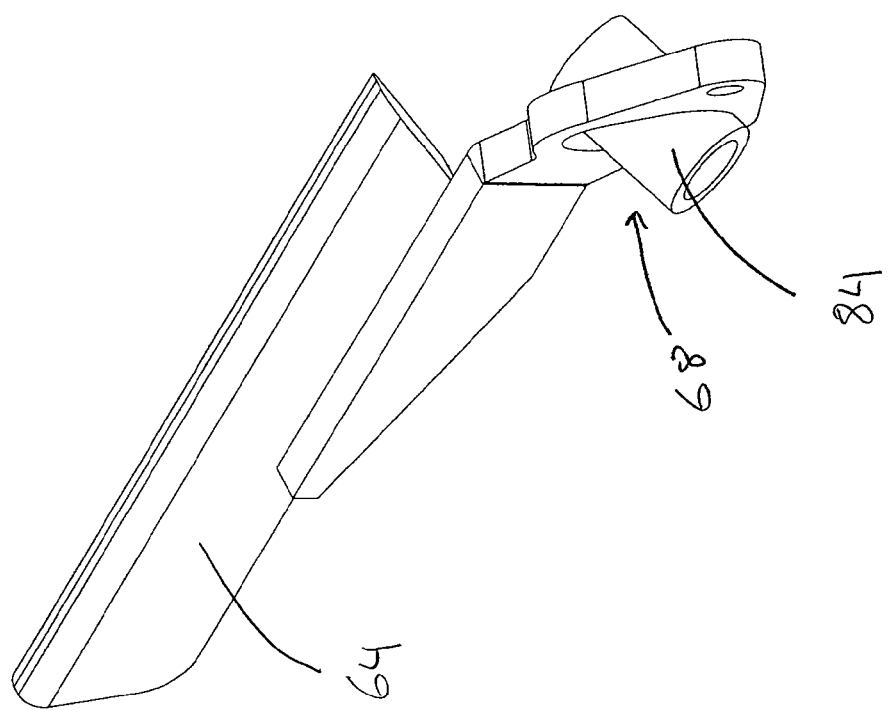
FIG. 9 is a gate having a bushing fastened thereto according to one embodiment of the present invention.
Figure 10:
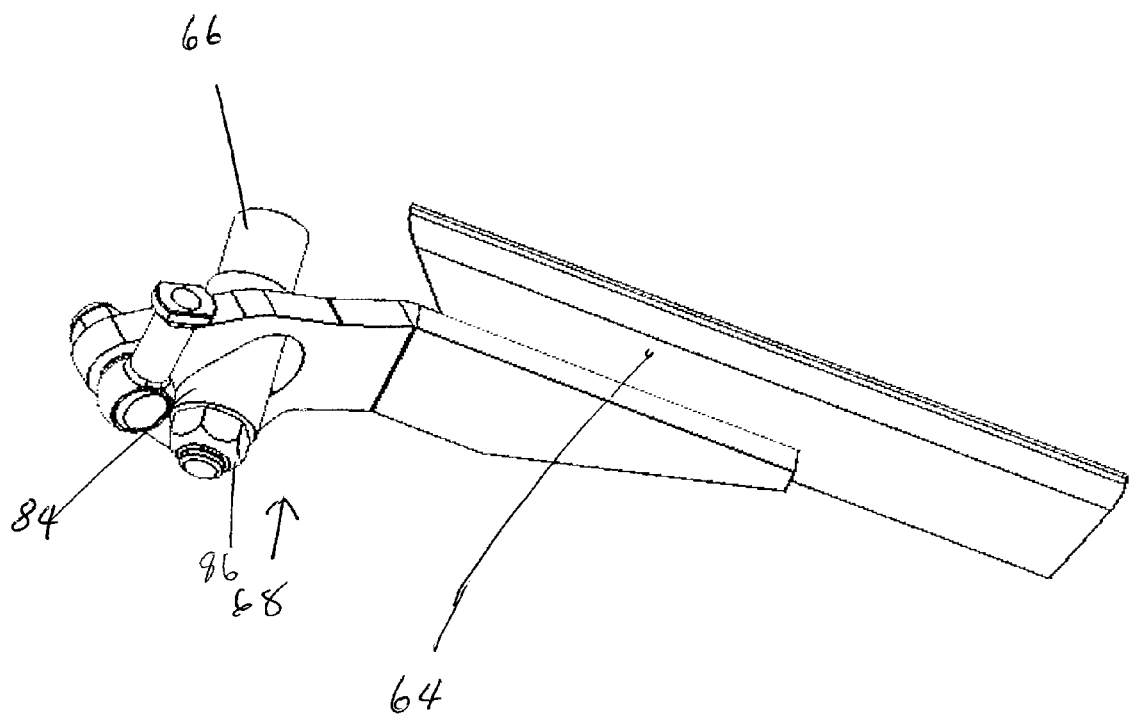
FIG. 10 is a perspective view of one embodiment of the gate operating mechanism with gate attached.
Figure 11:
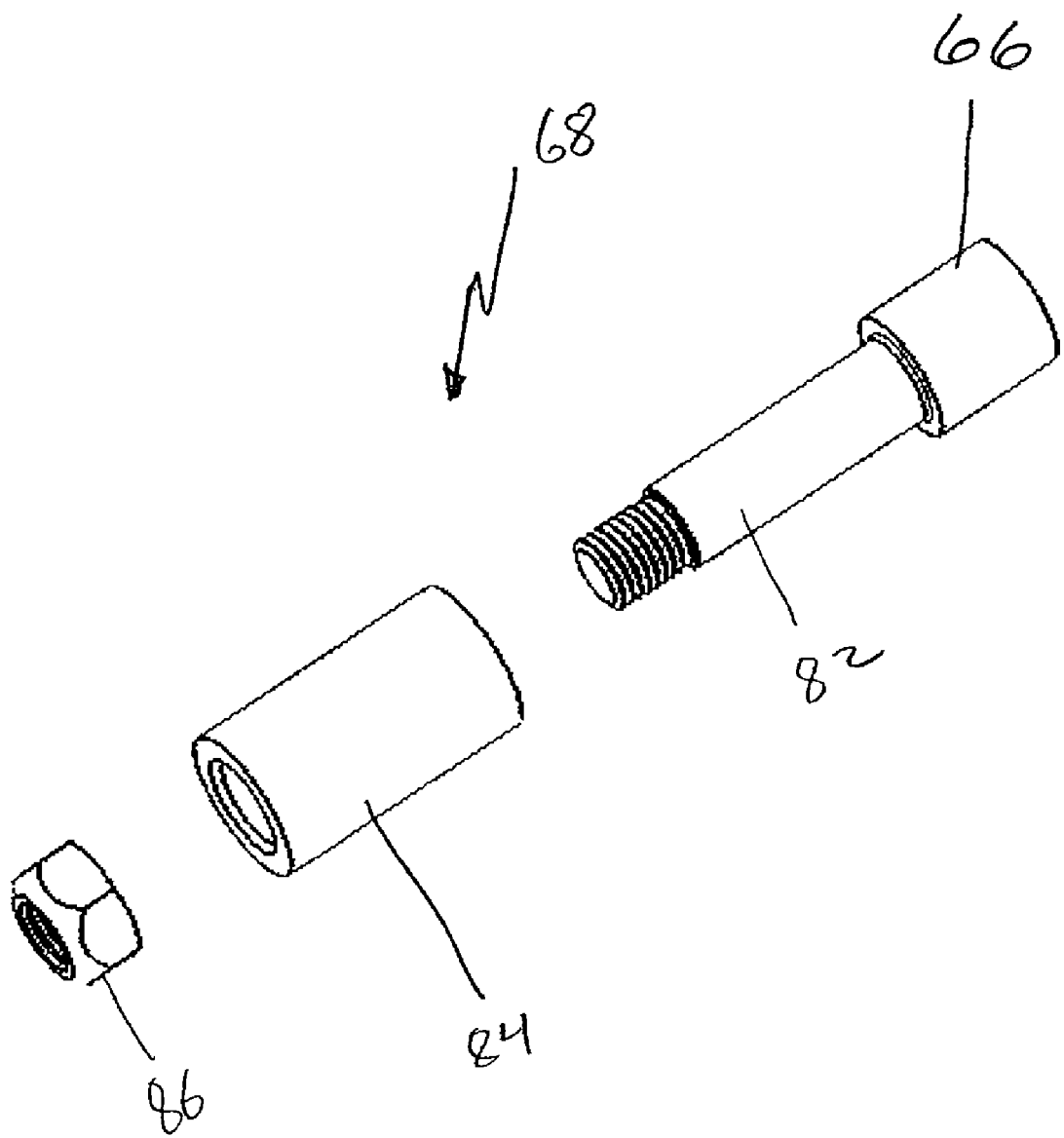
FIG. 11 is an exploded view of an embodiment of the gate operating mechanism.
Figure 12:
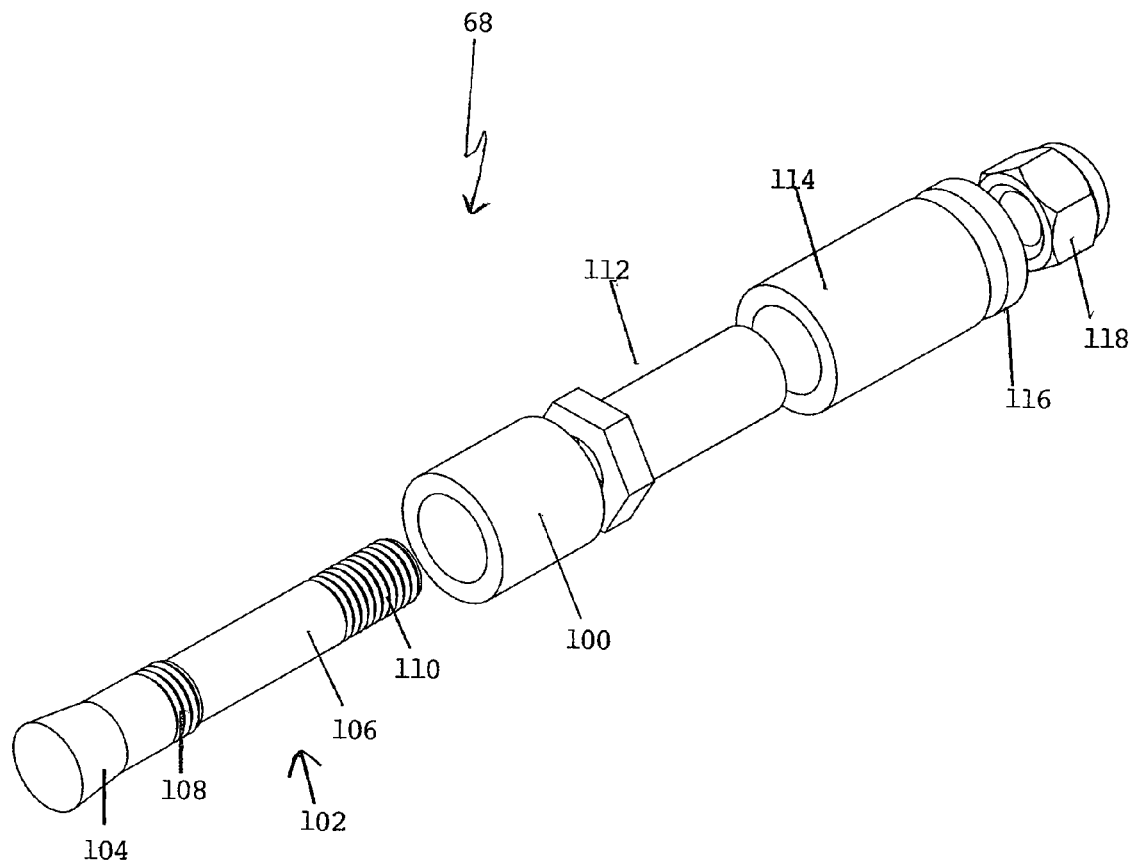
FIG. 12 is an exploded view of an alternative embodiment of the gate operating mechanism.
Figure 16:
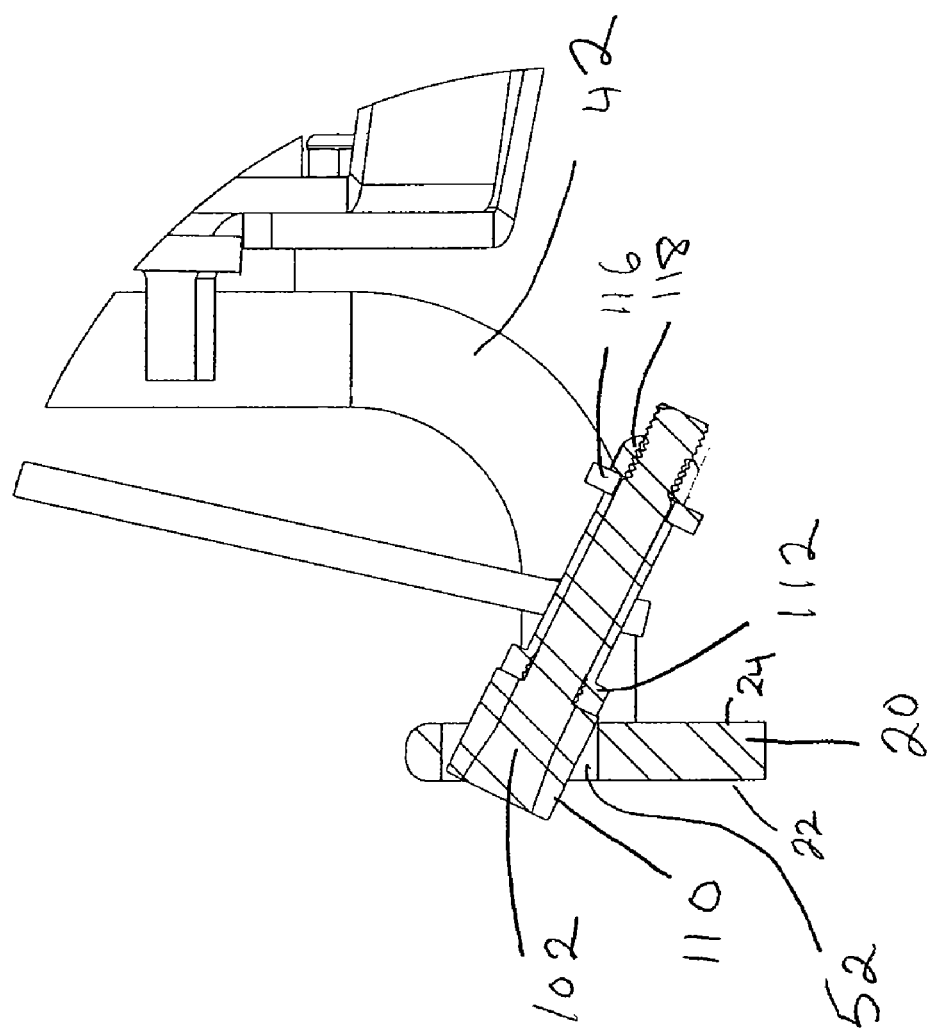
FIG. 16 is a cutaway view of the gate operating mechanism of FIGS. 12-15 in position on the rail switch and absent the bushing.
Figure 17:
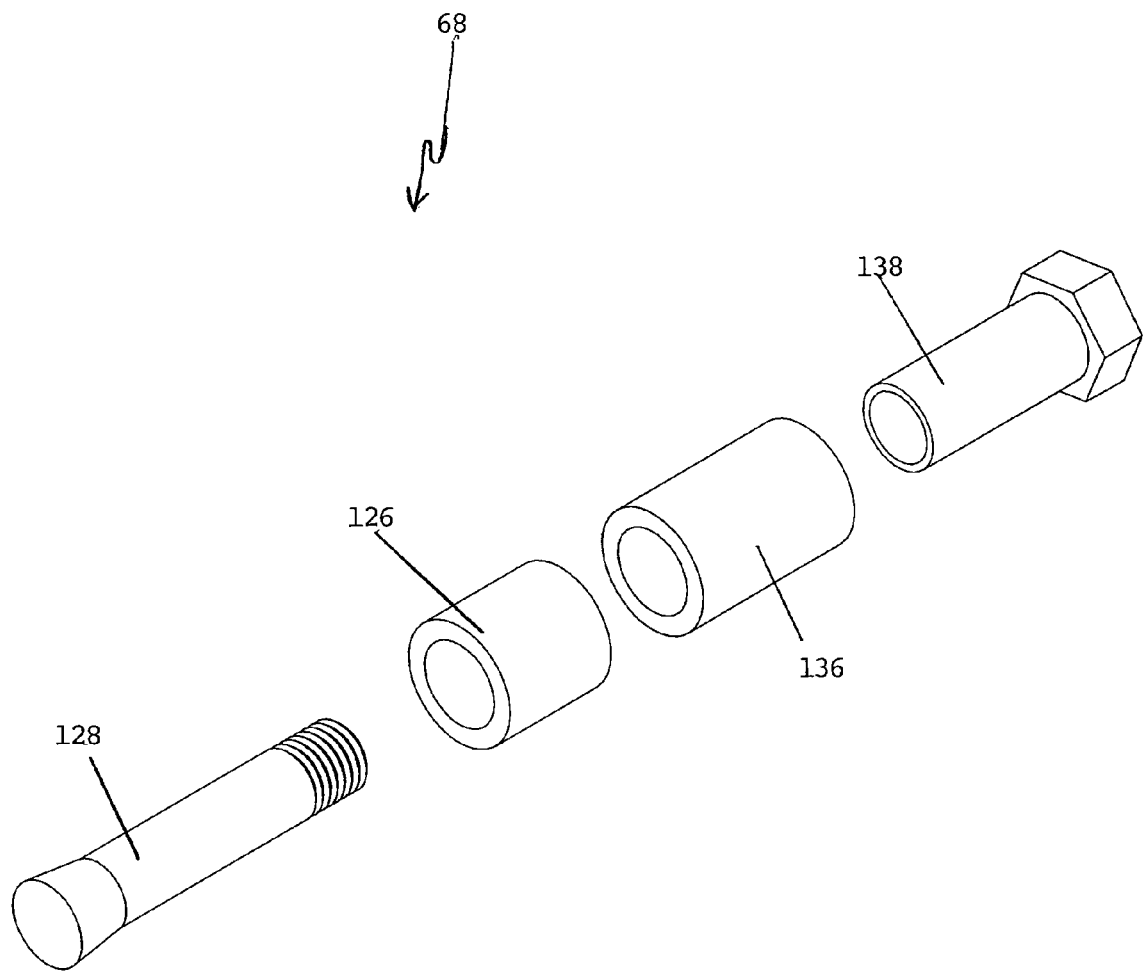
FIG. 17 is an exploded view of the gate operating mechanism of an alternative embodiment.
Figure 21:
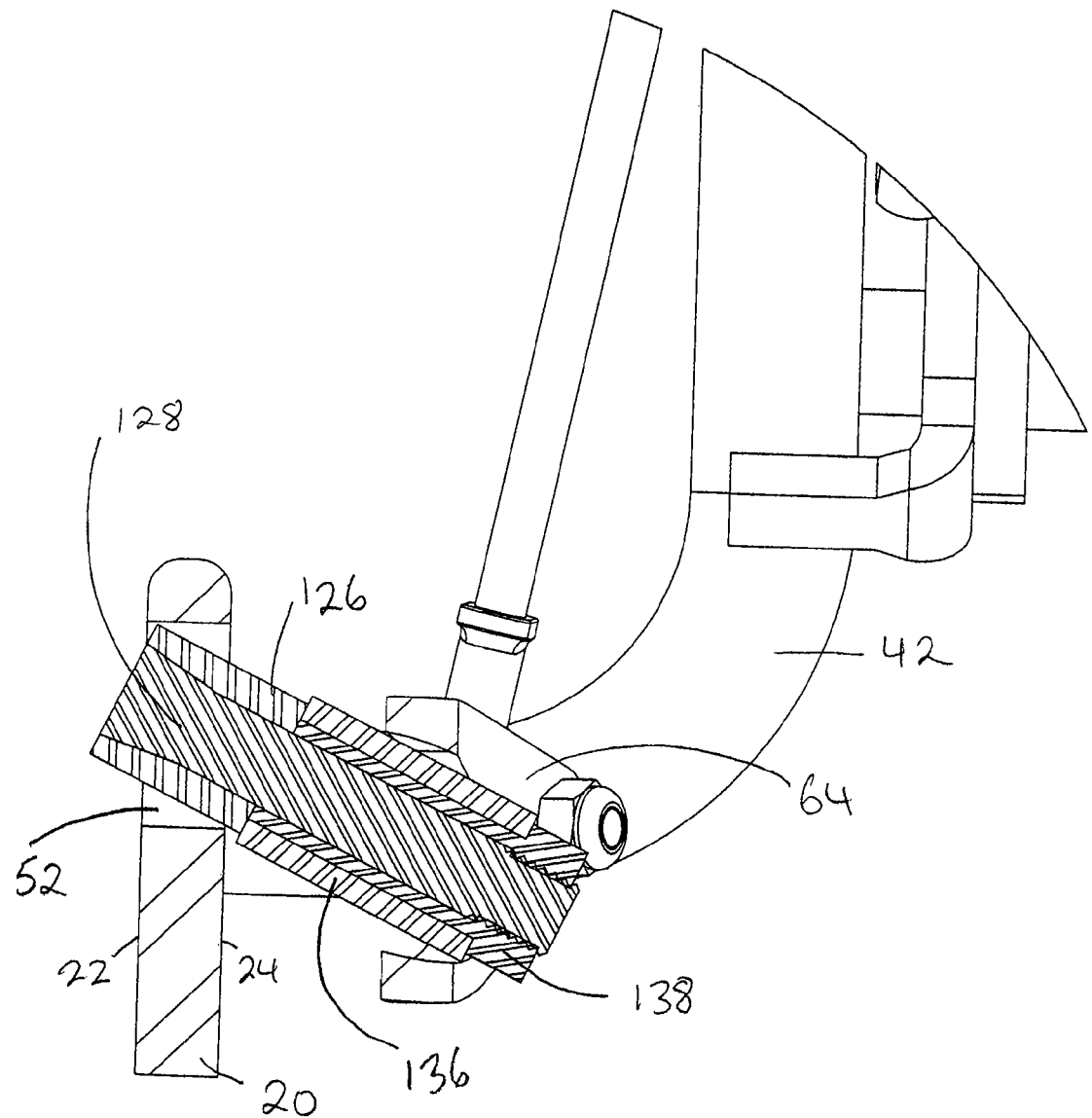
FIG. 21 is a cutaway view of the gate operating mechanism shown in FIGS. 17-20 attached to the rail switch.

Gate operating mechanism 68 may also include a bushing 84 (see FIGS. 9 and 10). As can be seen in FIGS. 10-11, pin 82 is rotatably received in bushing 84. Moreover, bushing 84 is attached to gate 64 so that the gate can open and close as pin 82 rotates within bushing 84. At the end of pin 82 which is opposite gate connecting portion 66, there are provided threads for threadably attaching pin 82 to a nut 86. The outer diameter of nut 86 is preferably of a size which is longer than the inner diameter of bushing 84 so as to prevent bushing 84 from sliding off of pin 82.

An alternative embodiment of the gate operating mechanism 68 is shown in FIGS. 12-16. In this embodiment, gate operating mechanism 68 includes block 100 which is shaped to mate with or be received in the aperture of the gate connecting mechanism 52 to achieve a snug fit. However, variation in the shape and dimension of the block 100 would not depart from the overall scope of the present invention. Specifically, the block 100 is received in the aperture of the gate connecting mechanism 52, and attached to the rail section 20 by a double weld. Similar to the mount connecting mechanism, the double weld includes a first weld mounting positioned at the contact location of block 100 and the first face 22, and a second weld mounting which is positioned on the opposite side of the rail section at the location where block 100 contacts the second face 24.

The alternate embodiment of the gate operating mechanism displayed in FIGS. 11-14 also includes a pin 102 which is received in block 100. The pin 102 comprises a head portion 104 and a neck portion 106. The head portion 104 of the pin 102 comprises a diameter which gradually increases in size in the direction opposite the neck portion 106. The neck portion 106 contains a first set of threads 108 located at the end of the neck portion 106 nearest the head portion 104, and a second set of threads 110 located at the end of the neck portion 106 farthest from the head portion 104. The interior portion of block 100 is formed so that the head portion 104 of pin 102 may be received in the block.

The embodiment further comprises a sleeve nut 112. The inside of sleeve nut 112 is formed so that neck portion 106 of pin 102 may be received therein. The head portion of sleeve nut 112 contains threads which engage the first set of threads 108 of pin 102 to secure pin 102 in place within sleeve nut 112. Bushing 114 is rotatably received over sleeve nut 112. In the preferred embodiment gate 64 is fixedly attached to bushing 114 (see FIG. 16) so that the gate can open and close as bushing 114 rotates around sleeve nut 112.

Sleeve nut 112 and bushing 114 are of a length which is smaller than neck portion 106 of pin 102 such that the part of the neck portion 106 which contains the second set of threads 110 will extend beyond sleeve nut 112 and bushing 114 when pin 102 is received within the assembly. The entire assembly is capped off with a washer 116 and nut 118. Nut 118 contains threads which engage the second set of threads 110 of pin 102. Nut 118 prevents bushing 114 from sliding off the assembly, while still allowing the bushing to rotate freely around sleeve bolt 112.

Yet another embodiment of the gate operating mechanism 68 is displayed in FIGS. 17-21. The embodiment displayed in FIGS. 17-21 comprises block 126 which is shaped to mate with or be received in the aperture 52 of gate connecting mechanism to achieve a snug fit. However, it is understood that variation in the shape and dimensions of the block 126 would not depart from the overall scope of the present invention. Specifically, the block 126 is received in the aperture of the gate connecting mechanism 52, and attached to the rail section 20 by a double weld. Similar to the mount connecting mechanism, the double weld includes a first weld mounting positioned at the contact location of block 126 and the first face 22. In addition, a second weld mounting is positioned on the opposite side of the rail section, at the location of the contact position of the block 126 and the second face 24.

The alternate embodiment of FIGS. 17-21 also includes a pin 128 which is received in block 126. The pin 128 comprises a head portion 130 and a neck portion 132. The head portion 130 of pin 128 comprises a diameter which gradually increases in size in the direction opposite the neck portion 132. The neck portion 132 contains a set of threads 134 located at the end of the neck portion 132 opposite the head portion 130. The threads 134 may be received in an inner thread 135 in the sleeve nut 138. The interior portion of block 126 is formed so that the head portion 130 of pin 128 may be received in the block.

The embodiment displayed also comprises a bushing 136 and sleeve nut 138. Pin 128 is received in sleeve nut 138. The head portion of sleeve nut 138 contains threads 135 which are formed to engage the set of threads 134 of pin 128. Bushing 136 rides on top of sleeve nut 138 in a manner that allows bushing 136 to rotate freely around sleeve nut 138. Moreover, gate 64 is fixedly attached to bushing 136 so that bushing 136 can rotate around sleeve nut 138 as gate 64 is opened and closed. The head portion of sleeve nut 138 is larger in diameter than the bushing 136 so that when sleeve nut 138 is engaged with pin 128 via threading, it prevents bushing 136 from sliding off the assembly.

An additional embodiment, as illustrated in FIGS. 22-25, includes a pin 150 having a shaft portion 152 upon which a rotatable bushing 154 rides and a threaded portion 156 for engaging an inner thread in block 158. As with the prior embodiments, the block 158 is received within the opening 52 of the rail, and attached in the same manner. The pin 150 also includes a head portion 160 for both retaining the bushing on the pin and for engagement with a tool (not shown) to rotatably lock the pin in position on the block.

As explained above, the gate 64 is pivotally attached to rail section 20 so that it can be opened and closed in order to direct trolleys along various routes in a rail system. The operation of rail section 20 can best be seen by reference to FIGS. 6 and 26. The rail section 20 of the present invention is illustrated in conjunction with a curved rail section 8 but may alternatively be used with straight rail sections. The rail section 8 is provided with gate 64. The gates 64 are operated using the gate operating mechanism 68 which includes cables 10 attached to lever system 12. The lever system is, in turn, attached to the switch mounting 40. As the lever is operated, the cables 10 exert a force on gate 64 which causes the gate 64 to pivot to either the open or closed position. The cable and lever system connects the gates in such a way that when one gate is opened, the other is closed (see FIGS. 6 and 26).

Figure 26:
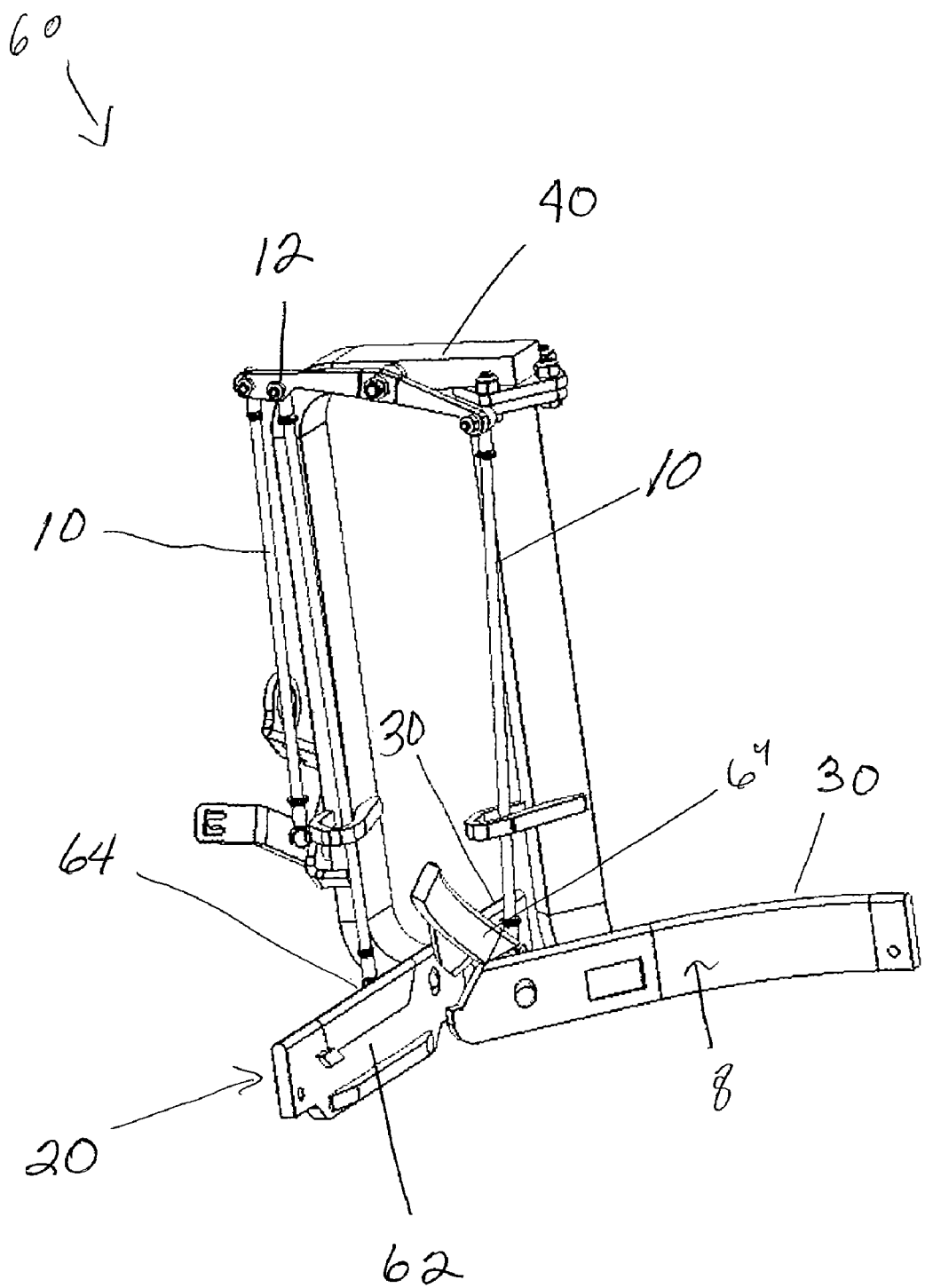
FIG. 26 is a perspective view of the switch assembly.

FIG. 26 shows the gate 64 connected to rail section 20 in its closed position. When the gate 64 is in this position, it is seated in the receptor portion 62 of rail section 20. At the same time, the gate 64 connected to rail section 8 is in its opened position. This would allow a trolley carrying product or goods to travel along the top surface 30 of rail section 20. FIG. 6 shows the switch mechanism 60 in its alternate position with the gate 64 of rail section 8 closed, and the gate 64 of rail section 20 open. The switch mechanism being set as displayed in FIG. 6 allows a trolley to travel along the top surface 30 of rail section 8. Accordingly, the switch mechanism 60 can be operated to direct trolley traffic in varying directions along intersecting rails of a rail system. To illustrate operation of the switch mechanism 60, the figures disclose a specific type of switch mounting 40 and a cable and lever system used to operate the gates. However, one skilled in the art would understand that the switch mounting and gate operating mechanism could vary without departing from the overall scope of the present invention.

The rail section 20 disclosed herein has a reinforced or strengthened gate receptor portion 62. In the embodiment displayed in FIG. 1, the gate receptor portion 62 of rail section 20 is that portion of rail section 20 which extends between imaginary lines a and b. As can be seen in FIG. 1, the gate receptor portion 62 comprises a recessed potion of the rail section 20 in which the gate 64 may be seated when it is in its closed position. This can be made, for example, by cutting out a portion of the rail section to create such a recess (see FIG. 1).

Figure 27:
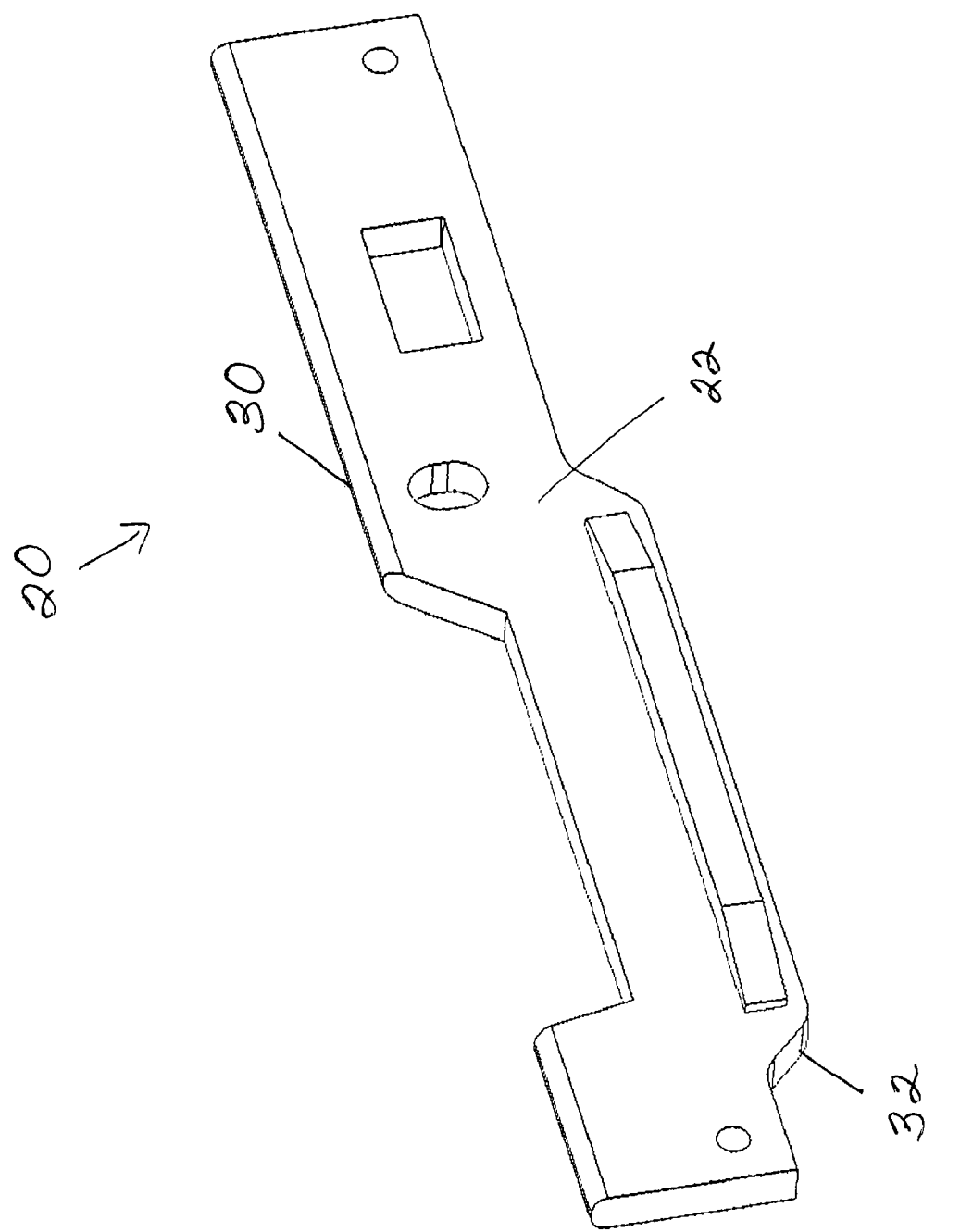
FIG. 27 is a perspective view of an alternate embodiment of the rail section of the present invention.

In the embodiment of the rail illustrated in FIG. 1 the receptor portion is strengthened by the addition of portion 200 of the rail section 20 which extends below imaginary line x. Thus, the bottom surface 32 of the receptor portion 62 is extended below the bottom surface 32 which runs along the rest of rail section 20. Additional material is provided in a uniform manner, creating a single reinforced component. In this way, the receptor portion of the rail section is strengthened. An alternative embodiment of the rails illustrated in FIGS. 27 and 28 wherein rail section 20 is further strengthened by providing additional portion(s) of rail section 20 which extend out of the plane created by the first face 22 of rail section 20. In the embodiment of these Figures, this additional portion of rail section 20 adds material in a partial trapezoidal shape, and may be combined with the extended bottom 200 of the rail shown in FIG. 1. However, any of a number of different shapes can be used to achieve the strengthening effect. Also, although the embodiment displayed in the Figures includes both an additional portion extending below imaginary line x-y as described above and displayed in FIG. 1, and an additional portion extending out of the plane created by first face 22, it should be understood that the rail section may be cut so as to include one or both of these additional portions. Moreover, as one skilled in the art would understand, the rail section 20 could be cut in various ways so as to include additional material as part of the gate receptor portion of the rail section, thereby strengthening it.

Figure 28:
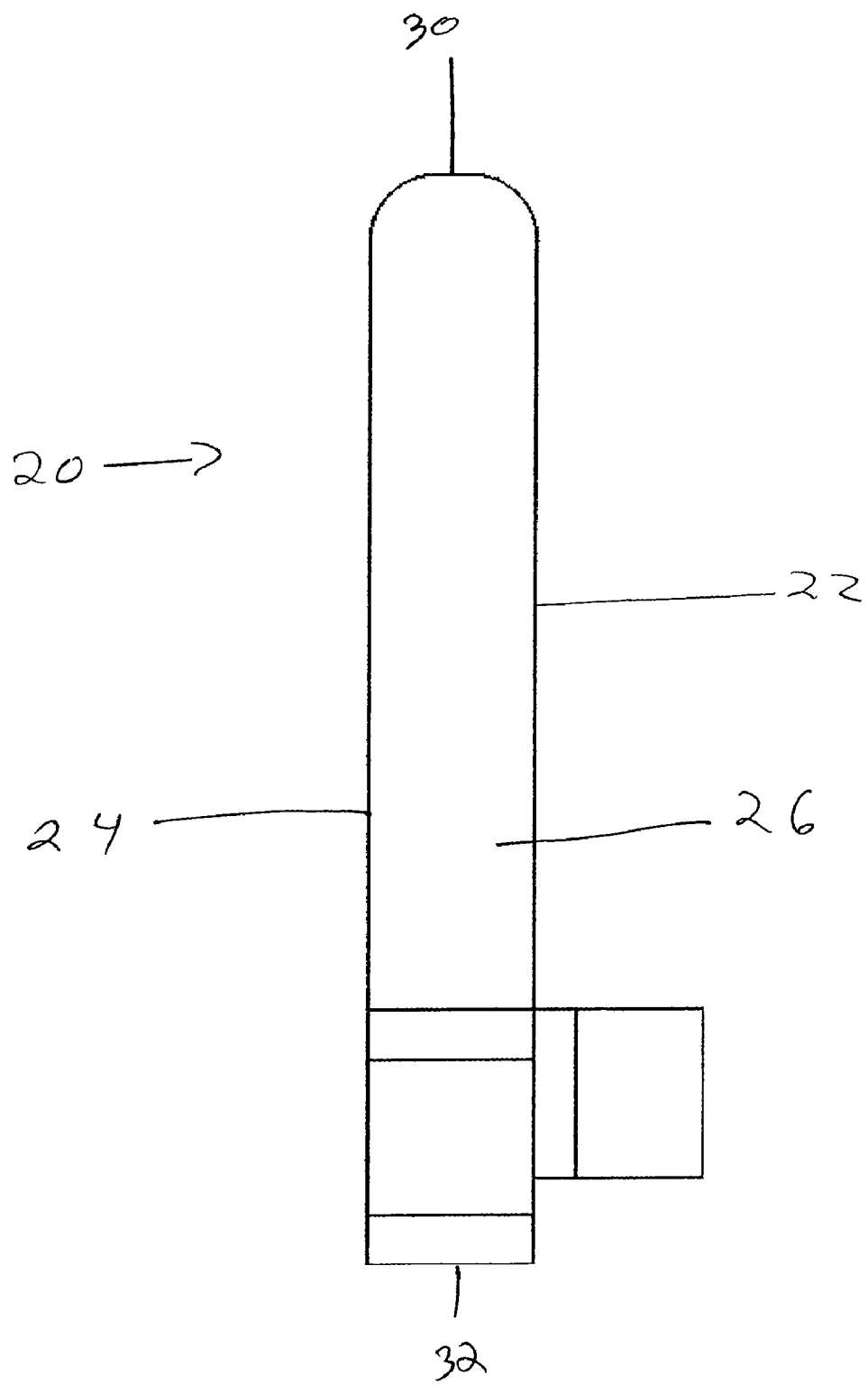
FIG. 28 is a front elevation view of the rail section of the present invention.

In addition, as can be seen in FIG. 28, the rail section 20 of the present invention is further strengthened by including a rounded top surface 30, and a planar bottom surface 32. A rail section of this shape will be stronger than one that has both a rounded top surface and a rounded bottom surface because it includes additional material in the bottom surface. Furthermore, the rail section can be cut in various ways which would form a shape having a bottom surface with a greater thickness than the top surface in order to strengthen the rail section. This not only strengthens the receptor portion 62 of the rail section 20, but it strengthens the entire rail section.

Figure 29:
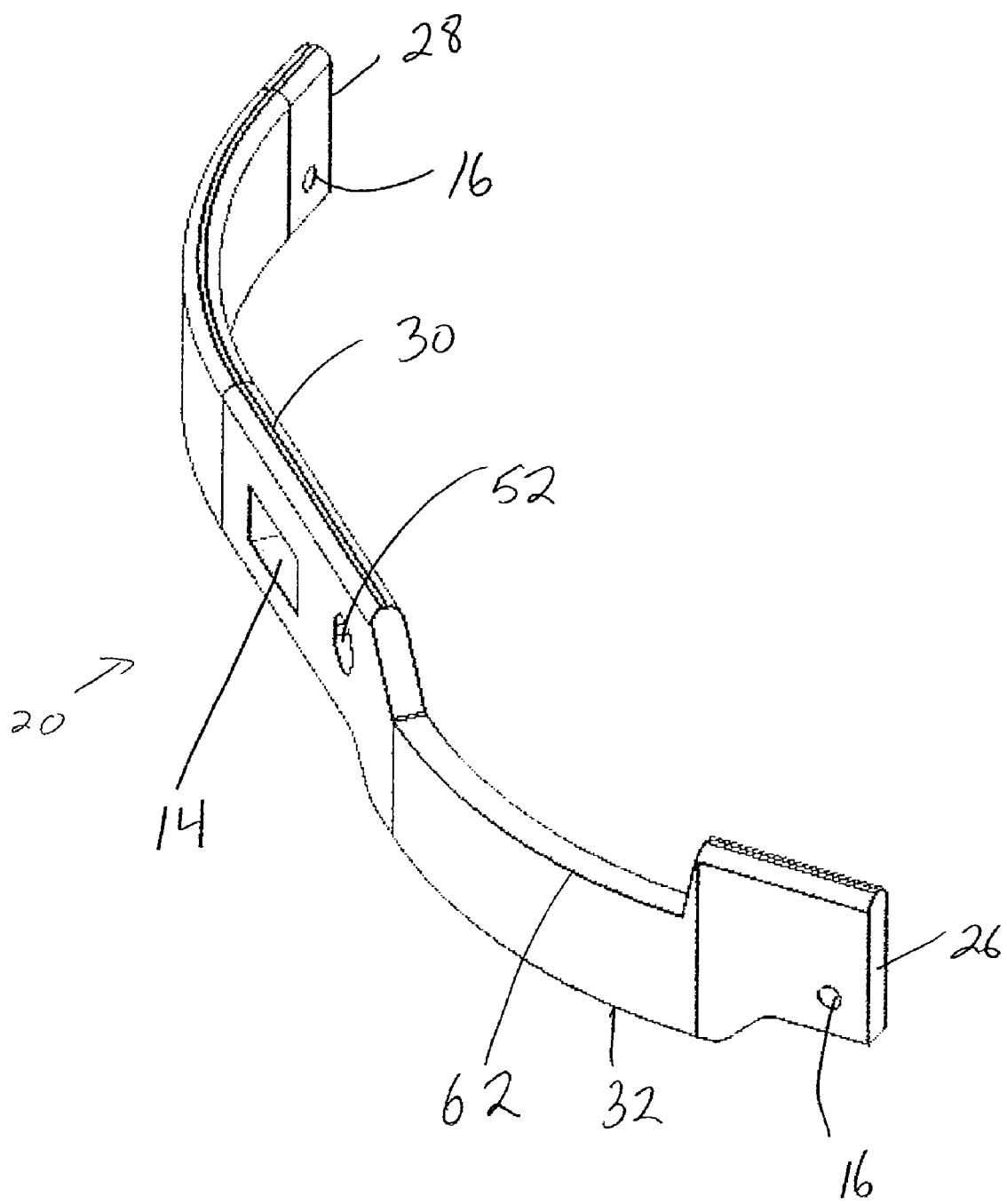
FIG. 29 is a perspective view of an alternate embodiment of the rail section of the present invention wherein the rail section has a curved shape.
Figure 30:
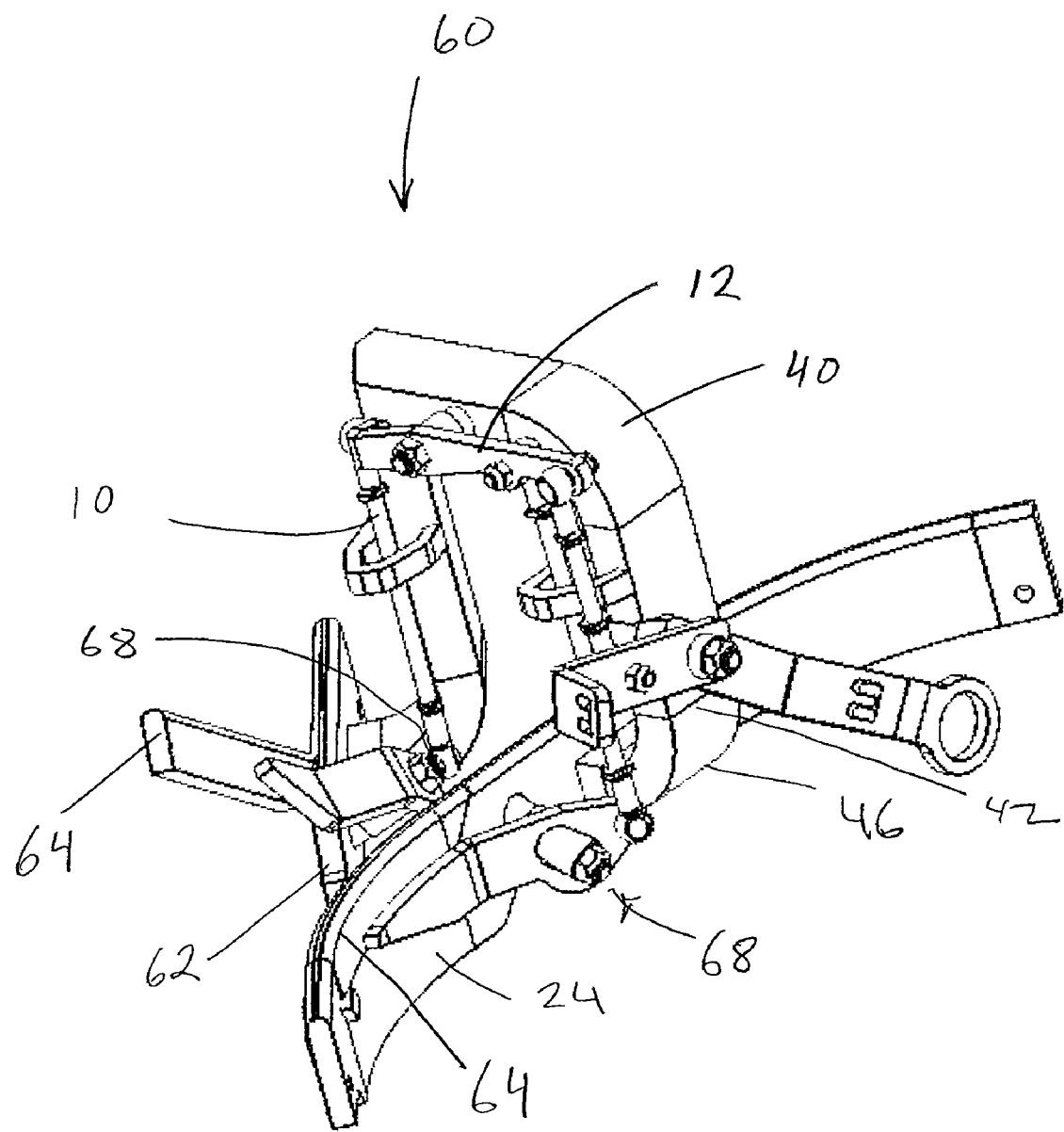
FIG. 30 is a perspective view of the switch assembly including a curved rail section.

FIGS. 29 and 30 show yet another embodiment of the invention wherein the rail section 20 comprises a curved shape. As seen in FIG. 30, one or more of the curved rail sections can be used in combination with one or more straight rail sections in order to direct trolleys in various directions along a tracked system. Moreover, as one of ordinary skill in the art would understand, the rail section 20 of the present invention can be cut to be of various different degrees of curvature allowing trolleys to travel away from the point of intersection at various angles.

With the rail section and switching mechanism for a conveyor assembly of the present invention being fully described above, the invention also includes a method of making and assembling same. Specifically, a rail section 20 of the present invention is provided. As described above and displayed in FIG. 1, the rail section 20 includes a mount connecting mechanism 14 comprising an aperture, a receptor portion 62 comprising a cut out portion of the rail section, and a gate connecting mechanism 52 comprising an aperture. Rail section 20, (including mount connecting mechanism 14, receptor portion 62 and gate connecting mechanism 52) can be formed by CNC cutting the rail section from a solid piece of material such as steel or stainless steel, but other materials would not depart from the overall scope of the invention. Doing so allows the rail section 20 to be cut with the highest precision so as to be within minimal tolerances. This ensures that replacement pieces such as the switch mounting and gate operating mechanism will form a more perfect fit. Alternative methods of forming the rail and components of the gate are contemplated, including, but not limited to die cut, mold, laser, water jet, and/or plasma.

A switch mounting 40 is also provided. The switch mounting includes mount connecting portion 42 (FIGS. 3-5). The mount connecting portion 42 is inserted into the mount connecting mechanism 14 of the rail section 20. The mount connecting portion 42 is then welded to the rail section 20. Specifically, a double weld is used by placing a weld on each face of the rail section 20 at the point where the face of rail section 20 contacts mount connecting portion 42 of the switch mounting 40. In this way, the switch mounting is secured to the rail section.

A gate operating mechanism is provided (FIGS. 6-25). Various different embodiments of the gate operating mechanism are disclosed in the FIGS. In the embodiment disclosed, gate connecting portion 66 of pin 82 is inserted into gate connecting mechanism 52 of rail section 20. Gate connecting portion 66 is then welded to the rail section 20. Again, a double weld is used. Specifically, a weld is placed on each face of the rail section 20 at the point where the face of rail section 20 contacts connecting portion 66.

As an example, in the embodiment described in FIGS. 12-16, block 100 is first inserted into gate connecting mechanism 52 and then welded in place using a double weld (described above). Pin 102 is then inserted into block 100 and sleeve nut 112 which is positioned on the other side of block 100. As pin 102 is inserted into block 100, it is threaded into place with the threads on the pin engaging the threads in the sleeve nut. Bushing 114 (with gate 64 fixedly attached) is inserted over sleeve nut 112. The whole assembly is held in place by washer 116 and nut 118 which is attached to pin 102 via threading. The alternative embodiments of the gate connection mechanism may be similarly mounted to the rail and fastened according to the components respectively contained therewith.

The rail switch mechanism, and specifically the rail section of the current invention is unique in that rail sections currently used in rail switch mechanisms do not include the mount connecting mechanism 14 as described herein. Instead, current mount connecting portions of the switch mounting are merely positioned against one face of the rail section and a single weld applied to the point where the two components connect. The mortise and tenon type joint created by the mount connecting mechanism 14 of the present invention is much stronger than the abutment-type joint currently employed to connect rail sections to switch mountings. This allows the rail to support more weight without breaking free from the switch mounting. Moreover, the mount connecting mechanism 14 of the present invention includes two weld mountings (one on each face of the rail section), as compared to the single weld mounting used in current rail switch mechanisms, further strengthening the connection between the rail section and switch mounting.

The gate connecting mechanism 52 provides the same benefits and advantages over the prior art as are described above for the mount connecting mechanism 14. Rail sections that are currently available are connected to gates by either bolting the gate to the rail section or butting pieces together and then applying a single weld to hold the pieces in place. The mortise and tenon type joint of the gate connecting mechanism 52 of the present invention is stronger and will hold the gate under greater pressure. This, in turn, will help to avoid the costs that may be involved when a gate breaks from a rail—including the cost of replacing the gate, and the lost productivity that may be involved when a conveyor needs to be taken out of service.

In addition, rail sections used prior to this invention have suffered from the problem of being weak in the gate receptor portion of the rail section. This problem is created because the receptor portion of the rail section is made to comprise less material than the rest of the rail section when a portion of the rail section is cut away in order to form the receptor. Because the receptor portion of the rail section includes less material than the rest of the rail section, it becomes a weak point and can more easily break as a trolley passes along that portion of the rail section. The rail section of the present invention solves this problem by including additional material in the receptor portion in order to strengthen that portion of the rail section.

Presently preferred embodiments of the invention and many of its improvements have been described with a degree of particularity. The previous description is of preferred examples for implementing the invention, and the scope of the invention should not necessarily be limited by this description. Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, angled, and so forth) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

What is claimed is:

1. A removable gate retention mechanism for a switching assembly on a conveyor, the gate retention mechanism comprising a pin operably connected to a gate and a bushing positioned and welded in a rail so as to extend through an aperture in the rail and be held in place by a first weld mounting and a second weld mounting, the bushing having a portion for receipt of at least a portion of the pin, the pin being removably attached to the bushing for releasable attachment of the gate to the rail.

2. The removable gate retention mechanism of claim 1, further comprising a sleeve nut operable to receive at least a portion of the pin.

3. The removable gate retention mechanism of claim 2, further comprising a bushing carried by the sleeve nut.

4. The removable gate retention mechanism of claim 3, further comprising a plurality of fastening means carried by the gate retention mechanism for fixed releasable attachment of the gate to the rail.

5. The removable gate retention mechanism of claim 3, wherein the bushing carried by the sleeve nut is attached to the gate.

6. The removable gate retention mechanism of claim 1, wherein the pin has a segment that engages the first side of the bushing to resist movement through the pin receptor.

7. The removable gate retention mechanism of claim 1 wherein the attachment device is a threaded attachment.

8. The removable gate retention mechanism of claim 1, wherein the pin is a bolt.

9. The removable gate retention mechanism of claim 8 wherein the pin is a shoulder bolt.

10. A removable gate retention mechanism for a switching assembly on a conveyor, the gate retention mechanism comprising a bushing positioned and welded in a rail and arranged to receive a pin therethrough, the bushing extending through an aperture in the rail and held in place by a first weld mounting and a second weld mounting, the pin being insertable on a first side of the bushing and rail and extending through the bushing outward from a second side of the bushing and rail, the pin carrying a gate rotatable thereon and secured by an attachment device to the pin arranged on the second side of the bushing and rail.

11. The removable gate retention mechanism of claim 10, wherein the pin has a segment that engages the first side of the bushing to resist movement through the pin receptor.

12. The removable gate retention mechanism of claim 10 wherein the attachment device is a threaded attachment.

13. The removable gate retention mechanism of claim 12 wherein the pin is a shoulder bolt.

14. The removable gate retention mechanism of claim 10, further comprising a sleeve nut operable to receive at least a portion of the pin.

15. The removable gate retention mechanism of claim 14, further comprising an additional bushing, the bushing being carried by the sleeve nut.

16. The removable gate retention mechanism of claim 15, wherein the additional bushing is attached to the gate.

17. The removable gate retention mechanism of claim 15, further comprising a plurality of fastening means carried by the gate retention mechanism for fixed releasable attachment of the gate to the rail.

18. The removable gate retention mechanism of claim 10, wherein the pin is a bolt.

* * * * *

UNITED STATES PATENT AND TRADEMARK OFFICE
CERTIFICATE OF CORRECTION

PATENT NO. : 8,011,304 B2  
APPLICATION NO. : 11/836268  
DATED : September 6, 2011  
INVENTOR(S) : Jager et al.

Page 1 of 1

It is certified that error appears in the above-identified patent and that said Letters Patent is hereby corrected as shown below:

In the Specification

In Column 4, Line 49, delete "portion 66" and insert -- connecting portion 66 --, therefor.

In Column 5, Lines 45-46, delete "sleeve bolt 112." and insert -- sleeve nut 112. --, therefor.

In Column 5, Lines 50-51, delete "aperture 52 of gate connecting mechanism" and insert -- aperture of the gate connecting mechanism 52 --, therefor.

Signed and Sealed this  
Seventeenth Day of September, 2013

Teresa Stanek Rea  
*Deputy Director of the United States Patent and Trademark Office*